United States Patent Office 3,573,287
Patented Mar. 30, 1971

3,573,287
SUBSTITUTED p-HYDROXYPHENYL-HYDRA-
ZONES AND PROCESS FOR THEIR MANU-
FACTURE
Manfred Schorr, Frankfurt am Main, Elmar Schrinner, Wiesbaden, and Karl Horst Teichmann, Hochheim (Main), Germany, assignors to Farbwerke Hoechst Aktiengesellschaft vormals Meister Lucius & Bruning, Frankfurt am Main, Germany
No Drawing. Filed Aug. 7, 1968, Ser. No. 750,748
Claims priority, application Germany, Aug. 16, 1967,
P 16 70 904.9
Int. Cl. C07d 31/42
U.S. Cl. 260—240
4 Claims

ABSTRACT OF THE DISCLOSURE

Substituted p - hydroxyphenyl - hydrazones of the formula

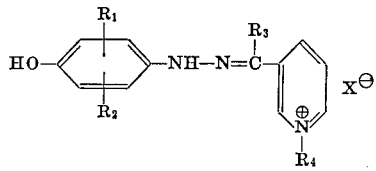

in which $R_1$ and $R_2$ represent hydrogen, halogen, lower alkyl or alkoxy, carboxy, carbamoyl, lower carbalkoxy, carbobenzoxy, sulfoxy or sulfamoyl; $R_3$ represents hydrogen or lower alkyl having 1 to 3 carbon atoms, $R_4$ represents an alkyl radical having 1 to 12 carbon atoms, which may carry one or several hydroxy, lower alkoxy, carboxy, lower carbalkoxy, carbamoyl, nitrile, sulfo, lower sulfalkoxy and/or sulfamoyl groups, and X represents the anion of a non-toxic acid, which compounds have bacteriostatic properties.

The present invention relates to substituted p-hydroxyphenyl-hydrazones of the general formula

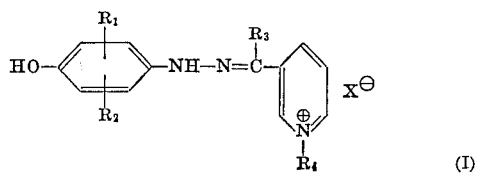

in which $R_1$ and $R_2$ each represents hydrogen, halogen, lower alkyl or alkoxy, carboxy, carbamoyl, lower carbalkoxy, carbobenzoxy, sulfoxy or sulfamoyl;
$R_3$ represents hydrogen or lower alkyl having 1 to 3 carbon atoms;
$R_4$ represents an alkyl radical of from 1 to 12 carbon atoms, which may carry one or several hydroxy, lower alkoxy, carboxy, lower carbalkoxy, carbamoyl, nitrile, sulfo, lower sulfalkoxy and/or sulfamoyl groups and
X represents the anion of a non-toxic acid.

The present invention, furthermore, relates to a process for the manufacture of the specified compounds, which comprises (a) reacting p-hydroxyphenyl-hydrazines of the formula

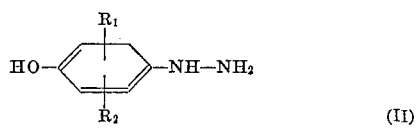

or acid addition salts thereof with carbonyl compounds of the formula

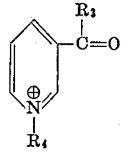

or functional derivaties thereof or
(b) quaternizing compounds of the formula

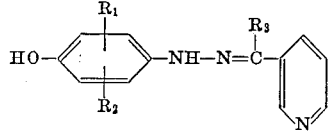

and, if desired converting the products of the invention, in case they contain acid groups, into the corresponding betains or the betains obtained into physiological tolerable salts.

(a) The p-hydroxyphenyl-hydrazines of the Formula II or the acid addition salts thereof, used as starting products for the process of the invention according to (a), may be prepared by known methods from the correspondingly substituted p-hydroxyphenyl-amines, for example by diazotizing them, transforming the products into diazosulfonates, reducing them to form hydrazo-sulfonates and finally splitting the hydrazo-sulfonates by means of aqueous or alcoholic acids to form acid addition salts of p-hydroxyphenyl-hydrazines. Whereas the free bases are unstable liquids or solid substances that decompose easily, the acid addition salts are relatively stable crystalline substances that are easy to handle.

As second reaction component according to (a), compounds of the Formula II which are quaternized at the nitrogen atom of the pyridine nucleus are used. In this formula, the radical $R_3$ represents hydrogen or lower alkyl, such as methyl, ethyl, n-propyl or i-propyl. The radical $R_4$ may represent a linear or branched alkyl radical having 1 to 12, preferably 1 to 4 carbon atoms, which may carry one or several substituents, for example hydroxy, lower alkoxy, carboxy, lower carbalkoxy, carbamoyl, nitrile, sulfo, lower sulfalkoxy and/or sulfamoyl groups.

As radicals $R_4$ of the above formula there may be mentioned: ethyl, isopropyl, tert.-butyl, isobutyl, n-hexyl; hydroxy-alkyl, such as 2-hydroxy-ethyl or 2,3-dihydroxy-propyl; alkoxyalkyl, such as methoxy-methyl and methoxy-ethyl; furthermore 3-carboxy-propyl and 3-sulfamido-propyl. X stands for an anion of a non-toxic acid, for example chloride, bromide, iodide, sulfate, methylsulfate or acetate.

Instead of compounds having a free carbonyl group, functional derivatives thereof may also be used, for example oximes, hydrazones, phenyl-hydrazones, semicarbazones, imines, azomethines, aminals, acetals, semiacetals, acetates, ketals, thioketals or enamines. In case the carbonyl compounds contain an acid function, the betains that are formed from the pyridinium salts by splitting off HX, may also be used.

It is advantageous to carry out the reaction of the p-hydroxy-phenyl-hydrazines of the Formula II with the 3-carbonyl-pyridinium salts of the Formula III in water and/or in solvents miscible with water, such as lower aliphatic alcohols, dioxane, tetrahydrofurane, dimethylformamide or pyridine, preferably mixtures of water and methanol or pure methanol or ethanol are used. The reaction may be carried out at a low or moderately elevated temperature, advantageously within the range of from 10 to 15° C. It is advantageous to use the acid addition salts, for example hydrochlorides, instead of the free p-hydroxyphenyl-hydrazines. The reaction may then be effected in the presence of weakly basic buffers, for example sodium acetate. It is, moreover, advantageous to operate in an oxygen-free atmosphere or to add a weak reducing agent, for example ascorbic acid, to the solution of p-hydroxyphenyl-hydrazine. It is, however, also possible to react the carbonyl compounds with compounds forming p-hydroxy-phenyl-hydrazines under the reaction conditions, for example p-hydroxy-phenyl-hydrazo-acyl compounds, in the presence of aqueous or alcoholic acids. p-Hydroxyphenyl-hydrazo-sulfonic acids or salts thereof may be used for this purpose.

(b) The p-hydroxyphenyl-hydrazones of the Formula IV may be used as starting materials for the preparation of the products of the invention according to (b). These compounds are prepared by reacting p-hydroxyphenyl-hydrazines of the Formula II with pyridine-3-carbonyl compounds and then reacted with an appropriate quaternizing agent to yield the products of the invention. As quaternizing agents there are suitable, for example, esters of inorganic acids of the general formula $R_4$—X, or instead thereof inner esters such as $\beta$-lactones and sulfones. Oxonium compounds are likewise suitable as quaternizing agents, especially trimethyl-oxonium-fluoborate and triethyl-oxonium-fluoborate. Quaternization may also be effected by a reaction with alkylene oxides, for example ethylene oxide or propylene oxide, in the presence of acids. Finally, compounds having activated olefinic double bonds may also be added on the starting substances of the Formula IV. Such compounds are, for example, $\alpha,\beta$-unsaturated carboxylic acids, such as acrylic acid, crotonic acid, maleic acid, fumaric acid, acetylene-dicarboxylic acid and methacrylic acid or esters and amides thereof; furthermore $\alpha,\beta$-unsaturated nitriles, such as acrylonitrile and methacrylonitrile; sulfonic acids, such as vinyl-sulfonic acid or the esters thereof with aliphatic alcohols or the amides thereof.

It is advantageous to carry out the reaction in solvents in which the individual components and/or the products of the invention are soluble, for example water, alcohols, nitriles, methylene chloride, dimethylformamide, dimethyl-sulfoxide, acetic acid esters and/or ethers. They may be effected at room temperature or at elevated temperature.

In many cases, the quaternary p-hydroxyphenyl-hydrazones of the nicotinoyl compounds precipitate from the reaction mixture in crystalline form and can be filtered off. Alternately, they can be precipitated from the reaction mixture by cautiously adding unpolar solvents, such as ethers or acetates, or evaporating the reaction solution in vacuo until crystallization sets in. Products of the invention that contain acid groups can be converted into the corresponding betains that are, in most cases, scarcely soluble and thus can be separated from the reaction mixture.

The products of the present invention are substances forming very beautiful crystals of an orange to deep red color, some of which do not have a defined melting point and some decompose prior to melting. Depending on the nature of the substituents and of the anions X, they are more or less soluble in water. In case the products of the invention contain acid groups they can be converted into the corresponding betains by splitting off (buffering off) HX, or the betains obtained can be converted into the corresponding acid quaternary salts by acidification.

The quaternary p-hydroxyhenyl-hydrazones obtainable by the process of the invention may be used in the free form or, if desired in the form of their betains or salts as medicaments. They possess very high antibacterial activities, especially against gram-negative germs, for example *Eschericia coli* or *Bacterium proteus*. The substances of the invention are superior to known bacteriostatic substances in this respect. The following table demonstrates the results obtained by comparative tests of three substances prepared according to the invention and two known bacteriostatic substances.

| Formula | MIC-values in γ/ml. | | | |
|---|---|---|---|---|
| | Staph. aureus | Hämol. Strept. A | E. coli | Proteus mirab. |
| 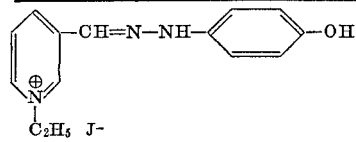 | 50 | 12.5 | 31.5 | 31.5 |
| 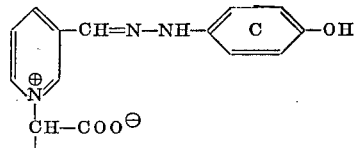 | 15.6 | 7.8 | 31.5 | 31.5 |
| 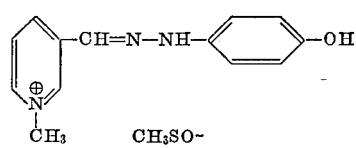 | 62.5 | 7.8 | 31.5 | 31.5 |
| 2-ethoxy-6,9-diaminoacridine | 3.1 | 3.1 | 62.5 | >5,000 |
| 1-(5-nitro-2-furfurylideneamino)-hydantoine | 15.6 | 15.6 | 31.5 | 250 |

The table shows the minimum bacteriostatic inhibition concentrations (MIC). The bacteriostatic activity was determined with the aid of the known serial dilution test. The nutrient medium used was Merck-Standard-Bouillin I. The amount of inseminated germs was about $10^5$ germs per milliliter. The indicated values were established on 3 series each with different dilution factors. The MIC-values represent the highest dilutions still capable of hindering the growth of the germs in the liquid primary culture. They are in inverse proportion to the bacteriostatic activity of a substance; the lower the MIC-value the higher the bacteriostatic activity. The values given in the table were determined by the method of J. C. Gould (Brit. Med. Bull. 16, 29 (1960)). The acute toxicity of the substance, on administration to rats per os is within an order of magnitude of from 500 to 1,000 mg. per kg. of body weight.

The compounds of the invention are useful as antibacterial additives to pharmaceutical, cosmetic or industrial products, as surface-antiseptics or for the local disinfection of wounds. They may also be employed for treating infections of the oral and pharyngeal cavities. When administered per os they are excreted in the urine in an unaltered form and impart to the urine a high bacteriostatic activity. They are therefore especially useful for controlling infections of the urinary tract.

The products of the present invention may be used, as far as they are intended for use as medicaments, in free form or in salt form, if desired in admixture or conjunction with pharmaceutically suitable inert adjuvants or carriers. It is possible to process them into tablets, dragées, ointments, creams, lotions or powders. The galenic preparations are manufactured by usual methods. Solid preparations to be administered contain 50 to 100 milligrams of active substance per dosage unit.

The following examples serve to illustrate the invention, but they are not intended to limit it thereto.

EXAMPLE 1

1-ethyl-3-formyl-pyridinium-iodide-p-hydroxyphenyl-hydrazone 0.39 mol (83.0 grams) of nicotinaldehyde-p-hydroxyphenyl-hydrazone were dissolved in 800 ml. of dimethylformamide, 0.43 ml. (67.0 g.) of ethyl iodide were added thereto and the whole was heated for 2 hours on the vapor bath. Subsequently, the dimethylformamide was distilled off in vacuo, the residue was dissolved in a small amount of hot methanol, the solution was filtered with animal charcoal and ether was cautiously added thereto until crystallization set in. The whole was cooled, the precipitate was suction-filtered and dried in the dessicator over concentrated sulfuric acid. There were obtained beautiful red crystals which melted at 210° C. with decomposition. The yield amounted to 65% of the theoretical yield.

In an analogous manner there were obtained
(b) 1-n-butyl-3-formyl-pyridinium bromide-p-hydroxyphenyl-hydrazone, M.P. 212° C. (from glacial acetic acid/acetate); from nicotinaldehyde-p-hydroxyphenyl-hydrazone and n-butyl bromide;
(c) 1-n-dodecyl-3-formyl-pyridinium bromide-p-hydroxyphenyl-hydrazone, M.P. 105° C. (from glacial acetic acid) from nicotinaldehyde and n-dodecyl bromide;
(d) 1-methyl-3-formyl-pyridinium-methyl sulfate-p-hydroxyphenyl-hydrazone, M.P. 145° C. (from methanol) from nicotinaldehyde and dimethyl sulfate.
(e) 1-carboxymethyl - 3 - formyl-pyridinium-betain-p-hydroxyphenyl-hydrazone, M.P. 93° C. (from water) from nicotinaldehyde and bromoacetic acid.

EXAMPLE 2

1-(1,2-dicarboxy-ethyl)-3-formyl-pyridinium-betain-p-hydroxyphenyl-hydrazone 10 millimols (2.13 g.) of nicotinaldehyde-p-hydroxyphenyl-hydrazone were dissolved in 20 ml. of hot ethanol and a solution of 10 mmols (1.2 g.) of maleic acid in alcohol was added thereto. The mixture was refluxed for 10 minutes and then cooled, the precipitate was suction-filtered, washed with ethanol and recrystallized from ethylene glycol. Red crystals were obtained that melted at 172°. The yield was 80% of the theoretical yield.

EXAMPLE 3

1-(3-sulfo-propyl)-3-formyl-pyridinium-betain-p-hydroxyphenyl-hydrazone 0.1 mol (21.3 g.) of nicotinaldehyde-p-hydroxyphenyl-hydrazone was dissolved in 200 ml. of hot ethanol, a solution of 0.11 mol (13.4 g.) of 1.3-propane-sulfone in a little ethanol was added thereto and the mixture was refluxed for 30 minutes. The substance already precipitated at boiling temperature. After cooling, the precipitate was suction-filtered and washed several times with ethanol.

The substance could be recrystallized from ethylene glycol and formed orange-colored crystals melting at 264° C. (with decomposition). The yield amounted to 91% of the theoretical yield.

In an analogous manner there was obtained
(b) 1-(2-carboxyethyl)-3-formyl-pyridinium-betain-p-hydroxyphenyl-hydrazone, M.P. 148° C. (decomposition) from nicotinaldehyde-p-hydroxyphenyl-hydrazone and propiolactone.

EXAMPLE 4

1-(2-hydroxy-ethyl)-3-formyl-pyridinium-chloride-p-hydroxyphenyl-hydrazone 0.1 mol (10.7 g.) of nicotinaldehyde was dissolved in 100 ml. of ethanol, 0.1 mol of ethanolic hydrochloric acid and then an ethanolic solution of 0.11 mol (4.85 g.) of ethylene oxide were added thereto. The mixture was allowed to dwell for three days at room temperature, then the excess of solvent was distilled off in vacuo and the residue was introduced while stirring into a solution of 0.1 mol (16.1 g.) of p-hydroxyphenyl-hydrazine HCl in 150 ml. of water. Stirring was continued for 30 minutes at room temperature, a small amount of acetone was added thereto and after cooling the precipitated product was separated by suction-filtering. After recrystallization from acetone/water there were obtained light-red needles melting at 213° C., in a yield of 46% of the theoretical yield.

The substance could also be obtained by quaternization of nicotinaldehyde-p-hydroxyphenyl-hydrazone with ethylene chloride.

We claim:
1. A p-hydroxyphenyl-hydrazone of the formula

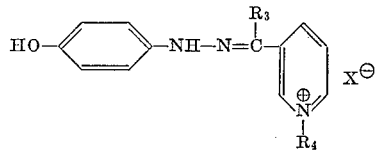

in which $R_3$ is hydrogen or lower alkyl of from 1 to 3 carbon atoms;

$R_4$ is alkyl of 1 to 12 carbon atoms or alkyl of 1 to 12 carbon atoms substituted by hydroxy, carboxy or sulfo, and X is the anion of a non-toxic acid; or a betaine derivative thereof.

2. 1 - ethyl-3-formyl-pyridinium-iodide-p-hydroxyphenyl-hydrazone.

3. 1-methyl - 3 - formyl-pyridinium-methylsulfate-p-hydroxyphenyl-hydrazone.

4. 1 - (1,2 - dicarboxy-ethyl) - 3 - formyl-pyridinium-betain-p-hydroxyphenyl-hydrazone.

References Cited

UNITED STATES PATENTS 3,158,608  11/1924  Raue _____ 260—240

FOREIGN PATENTS 460,521  1/1937  Great Britain _____ 260—566
1,019,120  2/1966  Great Britain _____ 260—240

OTHER REFERENCES

Burger: Medicinal Chemistry, vol. II, pages 1019 to 1025, Interscience Publishers, Inc., N.Y. (1951).

JOHN D. RANDOLPH, Primary Examiner

U.S. Cl. X.R.

260—296, 559; 424—263

PO-1050
(5/69)

UNITED STATES PATENT OFFICE
CERTIFICATE OF CORRECTION

Patent No. 3,573,287      Dated March 30, 1971

Inventor(s) Schorr, Schrinner and Tiechmann

It is certified that error appears in the above-identified patent and that said Letters Patent are hereby corrected as shown below:

In the heading, after "Germany," the date "Aug. 16, 1967" should read --Aug. 10, 1967--.

Signed and sealed this 22nd day of June 1971.

(SEAL)
Attest:

EDWARD M. FLETCHER, JR.
Attesting Officer

WILLIAM E. SCHUYLER, JR
Commissioner of Patents